United States Patent
Kataoka et al.

(10) Patent No.: US 9,558,865 B2
(45) Date of Patent: Jan. 31, 2017

(54) CABLE WITH RESIN MOLDED BODY AND METHOD OF MANUFACTURING THE SAME

(71) Applicant: Hitachi Metals, Ltd., Tokyo (JP)

(72) Inventors: Yuta Kataoka, Hitachi (JP); Yukio Ikeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 14/739,808

(22) Filed: Jun. 15, 2015

(65) Prior Publication Data
US 2015/0364230 A1     Dec. 17, 2015

(30) Foreign Application Priority Data
Jun. 17, 2014   (JP) .................................. 2014-124434

(51) Int. Cl.
*H01B 7/02*    (2006.01)
*H01B 13/06*   (2006.01)
(Continued)

(52) U.S. Cl.
CPC ............. *H01B 7/02* (2013.01); *B29C 45/0025* (2013.01); *B29C 45/14549* (2013.01);
(Continued)

(58) Field of Classification Search
CPC ............... B29C 45/22; B29C 45/14639; B29C 45/14549; H01B 7/02; H01B 13/06
(Continued)

(56) References Cited

U.S. PATENT DOCUMENTS 5,633,062 A * 5/1997 Saito ................ B29C 45/14639
                                                            324/167
7,421,909 B2   9/2008 Tsuge
(Continued)

FOREIGN PATENT DOCUMENTS

JP    2005-227177 A    8/2005
JP    4487851 B2       6/2010
(Continued)

OTHER PUBLICATIONS

Extended European Search Report dated Oct. 23, 2015.
(Continued)

*Primary Examiner* — William H Mayo, III
*Assistant Examiner* — Krystal Robinson
(74) *Attorney, Agent, or Firm* — McGinn IP Law Group, PLLC.

(57) ABSTRACT

A method of manufacturing a cable with resin molded body, wherein the cable with resin molded body includes a cable and a resin molded body formed by resin molding, wherein the resin molded body includes a main body to cover the tip portion of the cable and a flange integrally molded with the main body, and wherein the flange includes a bolt hole through which a bolt is inserted so as to fix the flange to the attachment object. The method includes molding the resin molded body by injecting a resin into a mold, the mold including a main body-molding portion for molding the main body, a flange-molding portion for molding the flange and a first resin inlet formed behind the flange-molding portion in relation to the main body-molding portion, and injecting the resin through the first resin inlet into the mold during the molding of the resin molded body.

19 Claims, 3 Drawing Sheets

(51) Int. Cl.
     *B29C 45/14*      (2006.01)
     *B29C 45/00*      (2006.01)
     B29L 31/34        (2006.01)
(52) U.S. Cl.
     CPC ........ H01B 13/06 (2013.01); *B29C 45/14639*
         (2013.01); *B29C 2045/0027* (2013.01); *B29L*
                                     *2031/3462* (2013.01)
(58) Field of Classification Search
     USPC .............................................. 174/70 R, 74 R
     See application file for complete search history.

(56) References Cited

U.S. PATENT DOCUMENTS

| | | | |
|---|---|---|---|
| 9,228,856 B2 * | 1/2016 | Schmidt .............. | B29C 45/1671 |
| 2006/0260418 A1 | 11/2006 | Tsuge | |
| 2007/0187869 A1 * | 8/2007 | Bierslaker ......... | B29C 45/14073 |
| | | | 264/265 |
| 2011/0143111 A1 * | 6/2011 | Yamamoto .............. | B29C 33/12 |
| | | | 428/213 |

FOREIGN PATENT DOCUMENTS

| | | |
|---|---|---|
| JP | 2013-142600 A | 7/2013 |
| NL | 1033143 C1 | 11/2007 |

OTHER PUBLICATIONS

Shoemaker, Jay, et al. "Moldflow Design Guide a Resource for Plastics Engineers", Dec. 31, 2006, XP055132560, Retrieved from the Internet: URL: http://marciaswan.weebly.com/uploads/1/3/5/8/13585698/mfdg_low-res_proof_part1 .pdf.

* cited by examiner

CABLE WITH RESIN MOLDED BODY AND METHOD OF MANUFACTURING THE SAME

The present application is based on Japanese patent application No. 2014-124434 filed on Jun. 17, 2014, the entire contents of which are incorporated herein by reference.

BACKGROUND OF THE INVENTION

1. Field of the Invention

The invention relates to a cable with resin molded body and a method of manufacturing the cable.

2. Description of the Related Art

A cable with resin molded body is known in which the resin molded body is formed by resin molding so as to cover a tip portion of the cable.

The cable with resin molded body is configured such that the resin molded body is formed to cover the tip portion of the cable and a member connected thereto (a sensor portion or a terminal etc.) all together and waterproof properties are provided by adhering the resin molded body to a covering of the cable (an insulation formed on the outermost periphery of the cable).

A cable with resin molded body 41 as shown in FIGS. 4A and 4B is known in which a resin molded body 44 has a main body 45 provided to cover a tip portion of a cable 42 as well as a sensor portion 43 and a flange 46 integrally molded with the main body 45 and used to fix the resin molded body 44 to an attachment object. The flange 46 has a bolt hole 47 through which a bolt is inserted so as to fix the flange 46 to the attachment object.

The resin molded body 44 is formed by resin molding as shown in FIG. 4C, the cable 42 and the sensor portion 43 are arranged in a mold 48 and a resin is then injected through a resin inlet 49.

In the conventional method of manufacturing the cable with resin molded body, the resin inlet 49 is formed on the mold 48 at a position facing an end portion of a covering 42a of the cable 42 so that the resin molded body 44 is adhered to the covering 42a of the cable 42. A high-temperature resin injected from the resin inlet 49 toward the covering 42a of the cable 42 softens the covering 42a which is then adhered to the resin molded body 44, thereby providing waterproof properties.

The cable with resin molded body 41 having the sensor portion 43 in the resin molded body 44 is used for ABS sensors, torque sensors and index sensors etc.

The prior art documents related to the present invention may be e.g. JP-A-2013-142600 and JP-B-4487851.

SUMMARY OF THE INVENTION

In forming the cable with resin molded body 41, however, since the resin is injected through a gate located at a position facing the covering 42a of the cable 42 at the base end portion of the main body 45, the injected resin flows around both sides of the bolt hole 47 at the flange 46 as indicated by arrows in FIGS. 4B and 4C and a weld (weld line) 50 may be formed at a position where the two resin flows meet again. If the weld 50 remains around the bolt hole 47, a crack may occur from the weld 50 when tightening the bolt.

Further, in forming the cable with resin molded body 41, since the resin is injected from the position facing the covering 42a of the cable 42 at the base end portion of the main body 45, the temperature of the resin may lower before reaching the flange 46 so that strain during the molding may remain so as to cause the warping of the flange 46. In some cases, the sensor portion 43 may require that the central axis of the sensor portion 43 is held at a right angle relative to the surface of the attachment object. If the flange 46 is warped, the accuracy of the right angle may lower so as to impair the performance of the sensor portion 43.

It is an object of the invention to provide a cable with resin molded body that prevents the crack when tightening the bolt and that prevents the warping of the flange, as well as a method of manufacturing the cable.

(1) According to one embodiment of the invention, a method of manufacturing a cable with resin molded body, wherein the cable with resin molded body comprises a cable and a resin molded body formed by resin molding so as to cover a tip portion of the cable, wherein the resin molded body comprises a main body to cover the tip portion of the cable and a flange to fix the resin molded body to an attachment object, the flange being integrally molded with the main body, and wherein the flange comprises a bolt hole through which a bolt is inserted so as to fix the flange to the attachment object, comprises:

molding the resin molded body by injecting a resin into a mold, the mold comprising a main body-molding portion for molding the main body, a flange-molding portion for molding the flange and a first resin inlet formed behind the flange-molding portion in relation to the main body-molding portion; and injecting the resin through the first resin inlet into the mold during the molding of the resin molded body.

In the above embodiment (1) of the invention, the following modifications and changes can be made.

(i) The first resin inlet is formed in communication with a part of the flange-molding portion across the bolt hole from the main body-molding portion, and wherein the resin is injected through the first resin inlet into the mold during the molding of the resin molded body.

(ii) The mold further comprises a second resin inlet formed at a position of a base end portion of on the main body-molding portion corresponding to a covering of the molded cable, and wherein the resin is further injected through the second resin inlet into the mold during the molding of the resin molded body.

(iii) The mold further comprises a third resin inlet formed at a top end portion of the main body-molding portion opposite the cable, and wherein the resin is further injected from the third resin inlet into the mold during the molding of the resin molded body.

(iv) An amount of the resin injected through the second resin inlet is more than that of the resin injected through the first resin inlet.

(v) The resin molded body is formed to cover a periphery of a sensor at the tip portion of the cable.

(2) According to another embodiment of the invention, a cable with resin molded body comprises:

a cable; and a resin molded body formed by resin molding so as to cover a tip portion of the cable, wherein the resin molded body comprises a main body to cover the tip portion of the cable and a flange to fix the resin molded body to an attachment object, wherein the flange is integrally molded with the main body, wherein the flange comprises a bolt hole through which a bolt is inserted so as to fix the flange to the attachment object, and wherein a weld is not formed at a position nearer the bolt hole in relation to the main body and is formed at a site other than the position (i.e., the site being nearer the main body in relation to the bolt hole).

Effects of the Invention

According to one embodiment of the invention, a cable with resin molded body can be provided that prevents the crack when tightening the bolt and that prevents the warping of the flange, as well as a method of manufacturing the cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

The embodiment of the invention will be described below in conjunction with the appended drawings.

Figure 1A:
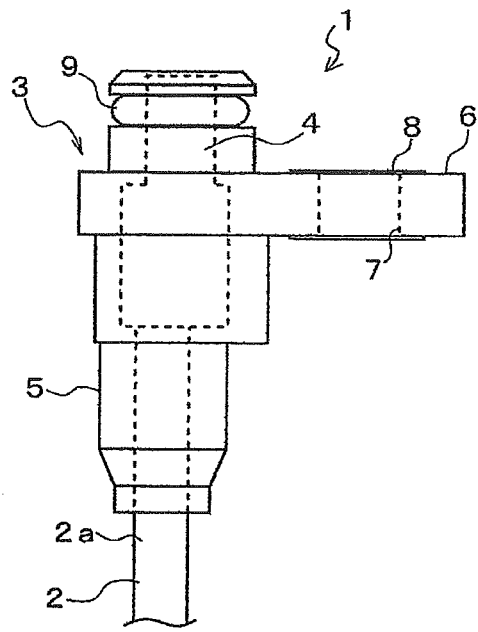
FIG. 1A is a side view showing a cable with resin molded body in an embodiment of the invention.
Figure 1B:
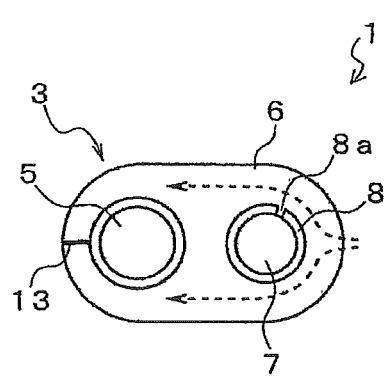
FIG. 1B is a top view of the cable in FIG. 1A.
Figure 1C:
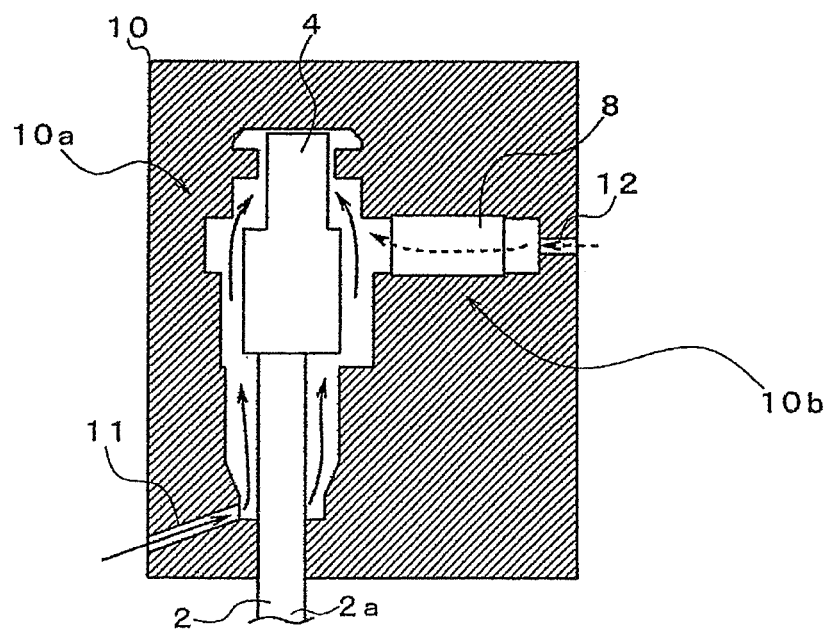
FIG. 1C is an illustration diagram showing a method of manufacturing a cable with resin molded body in the embodiment.

FIG. 1A is a side view showing a cable with resin molded body in the present embodiment, FIG. 1B is a top view thereof and FIG. 1C is an illustration diagram showing a method of manufacturing a cable with resin molded body in the present embodiment.

As shown in FIGS. 1A and 1B, a cable with resin molded body 1 is provided with a cable 2 and a resin molded body 3 formed by resin molding so as to cover a tip portion of the cable 2.

The resin molded body 3 is formed to cover an end portion of a covering 2a of the cable 2 and waterproof properties are provided by adhering the covering 2a to the resin molded body 3. In this embodiment, a sensor portion 4 is provided at a tip of the cable 2 and the resin molded body 3 is provided to cover the sensor portion 4 as well as the tip portion of the cable 2.

The covering 2a of the cable 2 is formed of urethane or PBT (polybutylene terephthalate). The resin molded body 3 needs to be formed of a material which can be adhered to the covering 2a. Thus, the resin molded body 3 is formed of nylon when using urethane to form the covering 2a and is formed of PBT when using PBT to form the covering 2a.

The resin molded body 3 has a main body 5 and a flange 6. The main body 5 is provided to cover the tip portion of the cable 2 as well as the sensor portion 4. The flange 6 is integrally molded with the main body 5 and is used to fix the resin molded body 3 to an attachment object (not shown).

The main body 5 is formed to cover the entire region from the end portion of the covering 2a of the cable 2 to the top end portion of the sensor portion 4. Alternatively, a portion of the sensor portion 4 on the top end portion side may be exposed from the main body 5.

The flange 6 is provided to extend from one side of the main body 5. The flange 6 extends in a direction perpendicular to an extending direction of the cable 2 (a direction along the central axis of the sensor portion 4).

The flange 6 has a bolt hole 7 through which a bolt is inserted to fix the flange 6 to the attachment object. In the bolt hole 7, a ring-shaped metal collar 8 is provided along an inner peripheral surface of the bolt hole 7. The collar 8 is formed by rolling a plate-shaped metal. Therefore, a slit 8a is formed along the axial direction of the collar 8 (a thickness direction of the flange 6).

In the present embodiment, the main body 5 is configured that the top end portion (a portion opposite to the cable 2 and beyond the flange 6) is inserted into a hole formed on the attachment object. Therefore, an O-ring 9 is provided at the top end portion of the main body 5 to provide waterproof properties between the main body 5 and an inner wall of the hole into which the main body 5 is inserted.

The cable with resin molded body 1 is used as, e.g., an ABS sensor, a torque sensor or an index sensor, etc. However, the intended purpose of the cable with resin molded body 1 is not limited thereto.

Next, a method of manufacturing a cable with resin molded body in the present embodiment will be described.

In the method of manufacturing a cable with resin molded body in the present embodiment, the sensor portion 4 is firstly attached to a tip of the cable 2, and the cable 2 and the sensor portion 4 are then placed in a mold 10. A holder may be additionally provided to cover a connecting portion of the cable 2 to the sensor portion 4, etc., so that wire breakage or positional shift due to the resin flow is prevented. The pre-made collar 8 is also placed in the mold 10. The mold 10 is provided with a main body-molding portion 10a for molding the main body 5 and a flange-molding portion 10b for molding the flange 6.

In the present embodiment, a first resin inlet 12 for injecting a resin is formed on the flange-molding portion 10b on the bolt hole 7 side with respect to the main body-molding portion 10a and a second resin inlet 11 also for injecting a resin is formed on the body-molding portion 10a at a position facing the covering 2a of the cable 2, so that a resin is injected from flange-molding portion 10b through the inlet located on the bolt hole 7 side with respect to the main body-molding portion 10a as well as from the base end portion of the body-molding portion 10a through the inlet located at the position facing the covering 2a of the cable 2 when resin molding the resin molded body 3.

Since the resin is injected from the base end portion of the body-molding portion 10a through the inlet located at a position facing the covering 2a of the cable 2, the covering 2a is exposed to the high-temperature resin for a long time and is softened and adhered to the resin molded body 3, and waterproof properties are thereby provided. The direction of injecting the resin is desirably slightly inclined toward the top end portion of the main body 5 so that the resin flows more smoothly.

By injecting the resin from the flange-molding portion 10b through the inlet located on the bolt hole 7 side with respect to the main body-molding portion 10a, a high-temperature resin is supplied and flows around the bolt hole 7 in the flange-molding portion 10b, thereby preventing a weld from being formed around the bolt hole 7. In addition, since it is possible to prevent temperature drop of the resin flowing into the flange-molding portion 10b, warpage of the flange 6 caused by residual strain in the molding process can be prevented.

In order to more reliably prevent a weld from being formed around the bolt hole 7, it is preferable that the resin be injected from a position further from the main body 5, and it is more preferable that the resin be injected from the flange-molding portion 10b through a gate located at a position facing the main body-molding portion 10a via the bolt hole 7 (a portion of the flange-molding portion 10b opposite to the main body-molding portion 10a with respect to the central axis of the bolt hole 7). In the present embodiment, the first resin inlet 12 is formed on the flange-molding portion 10b at a position facing the main body-molding portion 10a via the bolt hole 7 (i.e., a position which is farthest from the main body 5 and at which a weld is formed in the conventional technique). Therefore, the resin is injected toward the main body 5 from the flange-molding portion 10b through the inlet located at a position facing the main body-molding portion 10a via the bolt hole 7 when resin molding the resin molded body 3.

As such, in the present embodiment, two resin inlets 11 and 12 are provided on the mold 10 so that the resin is simultaneously injected from the both resin inlets 11 and 12 when resin molding the resin molded body 3.

As indicated by solid arrows in FIG. 1C, the resin injected from the second resin inlet 11 flows from the base end toward the top end portion of the main body-molding portion 10a. On the other hand, as indicated by dashed arrows in FIGS. 1B and 1C, the resin injected from the first resin inlet 12 flows in the flange-molding portion 10b toward the main body-molding portion 10a, then enters the main body-molding portion 10a, joins the resin injected from the second resin inlet 11, and then flows toward the top end portion of the main body-molding portion 10a.

In the present embodiment, the resin molded body 3 is formed mainly using the resin injected from the second resin inlet 11 (a conventionally used gate) and secondarily using the resin injected from the first resin inlet 12. Therefore, the amount of the resin injected from the second resin inlet 11 is larger than the amount of the resin injected from the first resin inlet 12.

In this regard, if the amount of the resin injected from the first resin inlet 12 is too small, a weld is formed on the flange 6 and causes a decrease in strength of the resin molded body 3 when attached to an attachment object. Thus, the amount of the resin injected from the first resin inlet 12 is desirably at least equal to or greater than the amount allowing the resin to flow into the main body-molding portion 10a after filling a portion of the flange-molding portion 10b on the bolt hole 7 side with respect to the main body-molding portion 10a.

On the other hand, if the amount of the resin injected from the first resin inlet 12 is too large, molding defects may occur due to air bubbles generated at the time joining the resin injected from the second resin inlet 11. Therefore, the amounts of the resins injected from the two resin inlets 11 and 12 should be appropriately determined so that two flow rates have a balance with which molding defects do not occur. The molding condition when using nylon to form the resin molded body 3 is, e.g., a molding temperature of 150 to 300° C.

In addition, since the resin is injected from the gate located at a position facing the collar 8 in the present embodiment, large resin pressure is applied to the collar 8.

Thus, if the slit 8a of the collar 8 faces the first resin inlet 12, it is considered that a force is applied in a direction of stretching the collar 8 when the resin is injected and residual strain in the resin around the collar 8 causes molding defects. Therefore, in the resin molding process, it is desirable that the collar 8 be arranged so that the slit 8a does not face in the flowing direction of the resin.

The mold 10 is removed after the resin injected from the two resin inlets 11 and 12 is cooled down, thereby obtaining the cable with resin molded body 1 in the present embodiment.

On the obtained cable with resin molded body 1, a weld is not formed on a portion of the flange 6 on the bolt hole 7 side with respect to the main body 5 and a weld 13 is formed at a position other than the portion of the flange 6 on the bolt hole 7 side with respect to the main body 5.

Although FIG. 1B shows an example in which the weld 13 is formed on the flange 6 around the main body 5, the formation position of the weld 13 can be appropriately adjusted by controlling a balance between the amounts of the resins injected from the two resin inlets 11 and 12.

As described above, in the method of manufacturing a cable with resin molded body in the present embodiment, since the resin molded body 3 is molded by injecting a resin into the mold 10 having the first resin inlet 12 on the flange-molding portion 10b on the bolt hole 7 side with respect to the main body-molding portion 10a to inject the resin, the resin is also injected from the flange-molding portion 10b through the inlet located on the bolt hole 7 side with respect to the main body-molding portion 10a when resin molding the resin molded body 3.

As a result, it is possible to prevent a weld line from occurring around the bolt hole 7 and also to change the formation position of the weld to a position at which problem of strength does not occur.

In addition, since a high-temperature resin is supplied to the flange-molding portion 10b by injecting the resin from the flange-molding portion 10b, strain generated by a decrease in resin temperature and resulting warpage of the flange 6 can be prevented. As a result, the angle of the central axis of the sensor portion 4 can be held at a right angle (or a desired angle) with respect to the surface of the attachment object, allowing sensor performance to be improved.

That is, in the present embodiment, it is possible to provide a cable with resin molded body and a method of manufacturing the same which makes cracks less likely to occur when tightening a bolt and prevents the flange 6 from warping.

Although the resin is injected from two gates in the present embodiment, three or more gates may be provided to inject the resin. For example, in the present embodiment, since the resins injected from the two resin inlets 11 and 12 reach the top end portion of the main body 5 at last, strain remains at the top end portion of the main body 5 due to fall in temperature of the resin and may cause defects such as deformation. Such defects are likely to occur especially when the cooling effect of the mold 10 is significant, such as when a distance from the two resin inlets 11 and 12 to the top end portion of the main body 5 (a flow path of the injected resin) is long or when the surface area of the resin molded body 3 is large.

Figure 2:
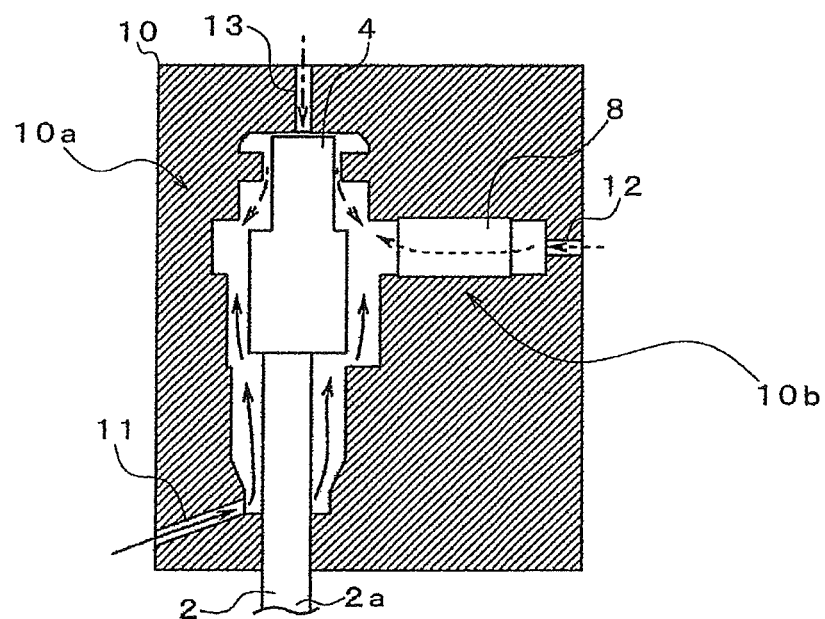
FIG. 2 is an illustration diagram showing a method of manufacturing a cable with resin molded body in a modification of the invention.

In case that such defects occur, a third resin inlet 14 may be further formed on the top of the main body-molding portion 10a (an end portion opposite to the cable 2) as shown in FIG. 2 so that the resin is injected through the three resin inlets 11, 12 and 14 to mold the resin molded body 3.

Figure 3:
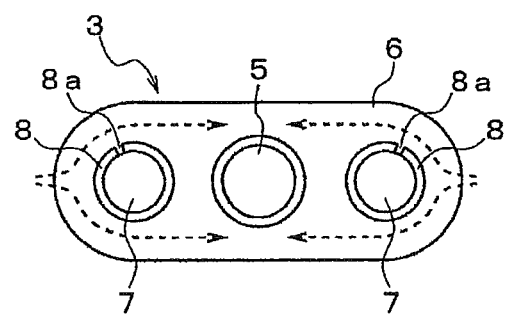
FIG. 3 is an illustration diagram showing a method of manufacturing a cable with resin molded body in another modification of the invention.
Figure 4A:
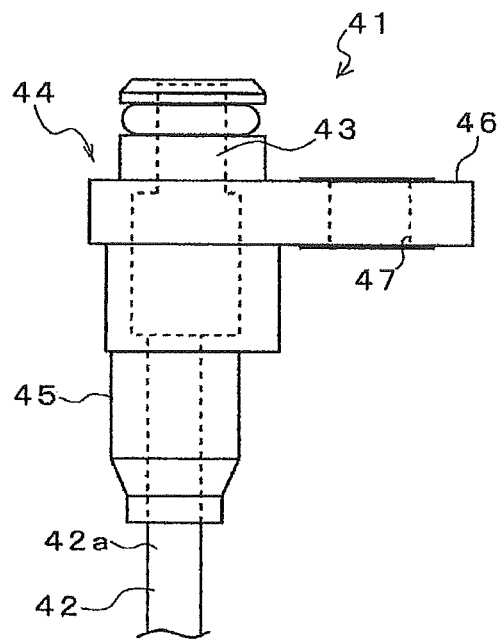
FIG. 4A is a side view showing the conventional cable with resin molded body.
Figure 4B:
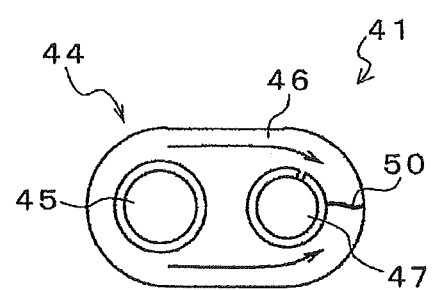
FIG. 4B is a top view of the cable in FIG. 4A.
Figure 4C:
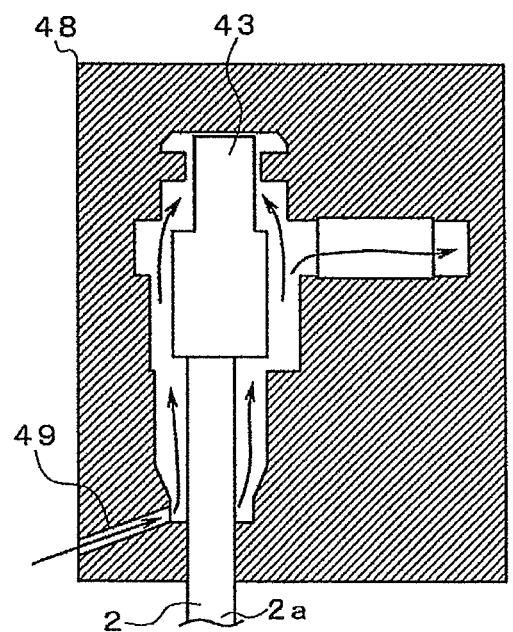
FIG. 4C is an illustration diagram showing the conventional method of manufacturing the cable with resin molded body.

Meanwhile, when the flange 6, which extends on both sides from the main body 5 and has two bolt holes 7 sandwiching the main body 5 as shown in FIG. 3, is formed by injecting a resin from only one end of the flange-molding portion 10b, a weld is formed around the bolt hole 7 located at another end. In such a case, resin inlets are formed at both ends of the flange-molding portion 10b so that the resin is injected from the both resin inlets toward the main body-molding portion 10a.

Furthermore, although the case of providing waterproof properties by adhering the resin molded body 3 to the covering 2a of the cable 2 has been described in the present embodiment, the resin may be injected from only the first resin inlet 12 without forming the second resin inlet 11 if waterproof properties are not required.

As such, the invention is not limited to the embodiment and it is obvious that the various kinds of modifications can be implemented without departing from the gist of the invention.

What is claimed is:

1. A method of manufacturing a cable with resin molded body, wherein the cable with resin molded body comprises a cable and a resin molded body formed by resin molding so as to cover a tip portion of the cable, wherein the resin molded body comprises a main body to cover the tip portion of the cable and a flange to fix the resin molded body to an attachment object, the flange being integrally molded with the main body, and wherein the flange comprises a bolt hole through which a bolt is inserted so as to fix the flange to the attachment object, the method comprising:
    molding the resin molded body by injecting a resin into a mold, the mold comprising a main body-molding portion for molding the main body, a flange-molding portion for molding the flange and a first resin inlet formed behind the flange-molding portion in relation to the main body-molding portion; and
    injecting the resin through the first resin inlet into the mold during the molding of the resin molded body,
    wherein the mold further comprises a second resin inlet faulted at a position of a base end portion of on the main body-molding portion corresponding to a covering of the molded cable, and
    wherein the resin is further injected through the second resin inlet into the mold during the molding of the resin molded body.

2. The method according to claim 1, wherein the first resin inlet is formed in communication with a part of the flange-molding portion across the bolt hole from the main body-molding portion, and
    wherein the resin is injected through the first resin inlet into the mold during the molding of the resin molded body.

3. The method according to claim 1, wherein the mold further comprises a third resin inlet formed at a top end portion of the main body-molding portion opposite the cable, and
    wherein the resin is further injected from the third resin inlet into the mold during the molding of the resin molded body.

4. The method according to claim 1, wherein an amount of the resin injected through the second resin inlet is more than that of the resin injected through the first resin inlet.

5. The method according to claim 1, wherein the resin molded body is formed to cover a periphery of a sensor at the tip portion of the cable.

6. The method according to claim 1, wherein a direction of injecting the resin through the second resin inlet is inclined toward a top end portion of the main body.

7. The method according to claim 1, wherein a ring-shaped metal collar is provided along an inner peripheral surface of the bolt hole.

8. The method according to claim 1, wherein the cable with resin molded body further comprises a collar formed by rolling a plate-shaped metal, and
    wherein a slit is formed along a thickness direction of the flange such that the slit of the collar does not face the first resin inlet.

9. The method according to claim 1, wherein a holder is provided to cover a connecting portion of the cable to a sensor portion of the cable with the resin molded body.

10. The method according to claim 1, wherein the cable with resin molded body further comprises a collar, and
    wherein a slit is formed along a thickness direction of the flange such that the slit of the collar faces other than the first resin inlet.

11. The method according to claim 1, wherein the first resin inlet is located at a position facing the cable.

12. A cable with resin molded body, comprising:
    a cable; and
    a resin molded body formed by resin molding so as to cover a tip portion of the cable,
    wherein the resin molded body comprises a main body to cover the tip portion of the cable and a flange to fix the resin molded body to an attachment object,
    wherein the flange is integrally molded with the main body,
    wherein the flange comprises a bolt hole through which a bolt is inserted so as to fix the flange to the attachment object,
    wherein a weld is not formed at a position nearer the bolt hole in relation to the main body and is formed at a site other than the position,
    wherein a mold is provided for molding the resin molded body by injecting a resin into a mold, the mold comprising a main body-molding portion for molding the main body, a flange-molding portion for molding the flange and a first resin inlet formed behind the flange-molding portion in relation to the main body-molding portion,
    wherein the mold further comprises a second resin inlet formed at a position of a base end portion of on the main body-molding portion corresponding to a covering of the molded cable, and
    wherein the resin is further injected through the second resin inlet into the mold during the molding of the resin molded body.

13. The cable with resin molded body according to claim 12, wherein a direction of injecting the resin through the second resin inlet is inclined toward a top end portion of the main body.

14. The cable with resin molded body according to claim 12, wherein a ring-shaped metal collar is provided along an inner peripheral surface of the bolt hole.

15. The cable with resin molded body according to claim 12, wherein the cable with resin molded body further comprises a collar formed by rolling a plate-shaped metal, and
    wherein a slit is formed along a thickness direction of the flange such that the slit of the collar does not face the first resin inlet.

16. The cable with resin molded body according to claim 12, wherein a holder is provided to cover a connecting portion of the cable to a sensor portion of the cable with the resin molded body.

17. The cable with resin molded body according to claim 12, wherein the cable with resin molded body further comprises a collar, and
   wherein a slit is formed along a thickness direction of the flange such that the slit faces other than the first resin inlet.

18. The cable with resin molded body according to claim 12, wherein the cable with resin molded body further comprises a collar, and
   wherein a slit is formed along a thickness direction of the flange such that the slit faces other than a flowing direction of the resin.

19. The cable with resin molded body according to claim 12, wherein the first resin inlet is located at a position facing the cable.

* * * * *